(12) United States Patent
Fejza et al.

(10) Patent No.: US 12,155,560 B2
(45) Date of Patent: Nov. 26, 2024

(54) METHOD FOR DETECTING ROUTING ANOMALIES BETWEEN AUTONOMOUS SYSTEMS

(71) Applicant: Orange, Issy-les-Moulineaux (FR)

(72) Inventors: Doris Fejza, Chatillon (FR); Anthony Lambert, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 8 days.

(21) Appl. No.: 18/318,590

(22) Filed: May 16, 2023

(65) Prior Publication Data
US 2023/0379240 A1 Nov. 23, 2023

(30) Foreign Application Priority Data
May 17, 2022 (FR) ...................................... 2204677

(51) Int. Cl.
*H04L 45/24* (2022.01)
*H04L 45/28* (2022.01)
*H04L 45/748* (2022.01)

(52) U.S. Cl.
CPC .............. *H04L 45/24* (2013.01); *H04L 45/28* (2013.01); *H04L 45/748* (2013.01)

(58) Field of Classification Search
CPC ....... H04L 45/28; H04L 45/24; H04L 45/748; H04L 45/02; H04L 45/04; H04L 45/08
See application file for complete search history.

(56) References Cited

U.S. PATENT DOCUMENTS

| | | | |
|---|---|---|---|
| 10,148,690 B2 | 12/2018 | Shen et al. | |
| 10,263,882 B2* | 4/2019 | Ramachandran | H04L 45/122 |
| 11,418,429 B2* | 8/2022 | Chaturmohta | H04L 45/04 |
| 11,552,876 B1* | 1/2023 | Zhang | H04L 45/28 |
| 2002/0184393 A1* | 12/2002 | Leddy | H04L 47/11 |
| | | | 709/250 |
| 2007/0002729 A1* | 1/2007 | Engel | H04L 45/04 |
| | | | 370/216 |
| 2016/0226760 A1* | 8/2016 | Liljenstolpe | H04L 45/04 |
| 2019/0149457 A1* | 5/2019 | Perrett | H04L 45/28 |
| | | | 370/216 |

(Continued)

OTHER PUBLICATIONS

M. Chen, M Xu, Q. Li and Y.Yang. "Measurement of large-scale BGP events: Definition, detection, and analysis", *Computer Networks* vol. 110, pp. 31-45, Sep. 2016.

(Continued)

*Primary Examiner* — Oanh Duong
(74) *Attorney, Agent, or Firm* — Knobbe, Martens, Olson & Bear, LLP

(57) ABSTRACT

A method for detection of an anomaly in paths for routing data to an address prefix in a network composed of autonomous systems, where the paths are announced to a local autonomous system by neighboring autonomous systems. The method includes: a) receiving information representative of at least one part of the paths during a time interval; b) generating a matrix comprising elements representative of path segments respectively connecting pairs of autonomous systems located on the paths; c) repeating a) and b) to obtain a sequence of matrices according to b); d) analyzing a similarity between the matrices; and e) in a case where at least one of the matrices differs from other matrices, detecting a routing anomaly.

16 Claims, 3 Drawing Sheets

(56) References Cited

U.S. PATENT DOCUMENTS

| | | | |
|---|---|---|---|
| 2020/0112574 A1* | 4/2020 | Koral | G06F 16/245 |
| 2020/0287734 A1* | 9/2020 | Nandy | H04L 45/58 |
| 2021/0083963 A1* | 3/2021 | Szarecki | H04L 45/04 |
| 2021/0135982 A1 | 5/2021 | Chaturmohta et al. | |
| 2021/0168021 A1* | 6/2021 | Wang | G06F 11/079 |
| 2021/0194918 A1* | 6/2021 | Earl | H04L 63/1416 |
| 2021/0250228 A1 | 8/2021 | Prakash et al. | |
| 2021/0258256 A1* | 8/2021 | Wang | H04L 45/02 |

OTHER PUBLICATIONS

M. Cheng, Q. Xu, L. Jianming, W. Liu, Q. Li, and J. Wan. "MS-LSTM: a Multi-Scale LSTM Model for BGP Anomaly Detection." *2016 IEEE 24th International Conference on Network Protocols (ICNP)*. IEEE, 2016.

M. Cosovic, S. Obradovio, and L. Trajkovic. "Classifying Anomalous Events in BGP Datasets." *2016 IEEE Canadian Conference on Electrical and Computer Engineering (CCECE)*. IEEE, 2016.

X. Dai, N. Wang, and W. Wang. "Application of machine learning in BGP anomaly detection." *Journal of Physics: Conference Series*. IOP Publishing, 2019.

Q. Ding, Z. Li, P. Batta, and L. Trajkovic, "Detecting BGP Anomalies Using Machine Learning Techniques." *2016 IEEE International Conference on Systems, Man, and Cybernetics (SMC)*. IEEE, 2016.

Y. Dong, Q. Li, R.Sinnott, Y. Jiang and S. Xia. "ISP Self-Operated BGP Anomaly Detection Based on Weakly Supervised Learning", *2021 IEEE 29$^{th}$ International Conference on Network Protocols (ICNP)*, pp. 1-11, Nov. 30, 2021.

P. Edwards, L. Cheng, and G. Kadam. "Border Gateway Protocol Anomaly Detection Using Machine Learning Techniques." *SMU Data Science Review*, vol. 2, No. 1, p. 5. 2019.

O. R. Sanchez, S. Ferlin, C. Pelsser, and R. Bush. "Comparing Machine Learning Algorithms for BGP Anomaly Detection using Graph Features." *Proceedings of the 3rd ACM CoNEXT Workshop on Big DAta*. 2019.

J. Saxe and K. Berlin "expose: A Character-Level Convolutional Neural Network with Embeddings for Detecting Malicious URLs, File Paths and Registry Keys." arXiv preprint arXiv:1702.08568. 2017.

T. Shapira and Y. Shavitt, "A Deep Learning Approach for IP Hijack Detection Based on ASN Embedding." *Proceedings of the Workshop on NetworkMeets AI & ML*. 2020.

* cited by examiner

METHOD FOR DETECTING ROUTING ANOMALIES BETWEEN AUTONOMOUS SYSTEMS

CROSS-REFERENCE TO RELATED APPLICATIONS

This application claims foreign priority to French Patent Application No. FR 2204677, entitled "METHOD FOR DETECTING ROUTING ANOMALIES BETWEEN AUTONOMOUS SYSTEMS" and filed May 17, 2022, the content of which is incorporated by reference herein in its entirety.

BACKGROUND

Field

The present disclosure relates to the field of routing data between autonomous systems of a wide area network such as the Internet for example.

More specifically, the present disclosure bears on a method for detecting an anomaly in paths for routing data to an address prefix (IP address for example).

Description of the Related Art

A wide area network such as the Internet, for example, is made up of autonomous systems, sets of networks and routers under control of an operator such as an Internet service provider, a research center or university.

In order to maintain global accessibility and conductivity of the Internet, autonomous systems must interconnect and exchange information relating to networks for which different operators are responsible, allowing autonomous systems to send traffic in data packet form.

The autonomous systems are interconnected and exchange routing information on the basis of a route exchange protocol called BGP (Border Gateway Protocol).

The interconnection between different autonomous systems is not a matter of chance and is often based on bilateral accords between operators. In case of a plurality of possible paths for routing data towards a single destination, i.e. towards a single address prefix (IP address for example, for Internet Protocol), the selection of the route that the traffic takes results from the sequential examination of the preferences of the autonomous systems through which the traffic passes, and also preferences of neighboring autonomous systems.

The paths for the routing of data are built as a sum of local decisions, and each autonomous system chooses locally and independently of other autonomous systems a "best" route towards a given destination.

The choice of the path between autonomous systems is complex and the routing information is not broadcast in the network but announced from neighbor to neighbor. The consequence of this is that each autonomous system has only a partial view of the existing routing paths. A given autonomous system knows in what way it may reach a destination. In contrast, this autonomous system is unaware of how the other autonomous systems effectively reach it and even less how the other autonomous systems reach each other.

An autonomous system may implement different actions in order to influence the traffic, in particular actions modifying the BGP attributes to which it has access, or actions changing the announcement of address prefixes for which it is responsible in order to influence in its favor the paths built by other autonomous systems.

It may therefore be difficult to anticipate the paths that the traffic takes.

The announcements of paths are based on confidence and there are few means of verifying the veracity of an announcement.

As a consequence of the fragility of the BGP protocol, its opacity and its verbosity, the Internet faces a number of safety issues including redirecting paths for the routing of data. Voluntary or not, these redirections may disturb the operation or allow the redirecting of traffic.

The routing paths may be redirected by hijacking, i.e. by an illegitimate announcement of prefixes resulting in a rerouting of traffic and an impact on associated services.

Further, the routing paths may be redirected by "man in the middle" type attacks, i.e. by intercepting traffic resulting from a local redirection of traffic without however disturbing accessibility of the destination.

These attacks allow the attacker to listen, record and manipulate traffic in the Internet.

Various processes have been developed in order to detect routing anomalies. In these processes, training models are fed BGP messages aggregated on successive time windows in order to extract statistical properties therefrom, related for example to the volume of data or the length of the AS PATH attributes contained in BGP messages. The AS PATH attribute indicates the path traveled by a BGP message.

However, in these approaches, the topological information contained in the AS PATH attribute is lost. Further, sophisticated attacks such as "man in the middle" attacks cannot be effectively detected with such approaches.

These methods generally make use of supervised approaches, which requires correctly labeled data which is unrealistic because of the complexity and opacity of the BGP messages.

There is therefore a need for a method with which to do an unsupervised analysis of BGP data in order to be able to effectively detect anomalies in the paths for routing data to an address prefix.

SUMMARY

For this purpose, a method is disclosed for detection of an anomaly in a set of paths for routing data to an address prefix in a network composed of autonomous systems, where the paths are announced to a local autonomous system by autonomous systems neighboring the local autonomous system, the method comprising:
  a) receiving information representative of at least one part of the set of paths during a time interval;
  b) generating, from the received information, a matrix comprising elements representative of path segments for the set of paths, where the path segments respectively connect pairs of autonomous systems located on the set of paths;
  c) repeating steps a) and b) in order to obtain a time sequence of matrices according to step b);
  d) analyzing a similarity between the matrices of the sequence; and
  e) in a case where at least one of the matrices from the sequence differs from other matrices from the sequence, detecting a routing anomaly.

An autonomous system is a set of networks and routers under a single administrative authority.

Various autonomous systems may be interconnected by paths for transporting traffic, and BGP routers (Border Gateway Protocol) implementing a BGP protocol, with a common objective of exchanging computer network routing and accessibility information for which the autonomous systems are responsible.

A local autonomous system may be an autonomous system to which the paths are announced.

A neighboring autonomous system as an autonomous system to which a local autonomous system is directly connected, meaning without having to pass by another autonomous system.

A pair of autonomous systems correspond to two neighboring autonomous systems which are located on a path.

Each autonomous system may announce on the Internet one or more address prefixes relating to prefixes for which it is responsible.

An address prefix indicates a range of network addresses.

A path for the routing of data corresponds to a path between autonomous systems over which the traffic is routed. A route may have as origin an autonomous system and as a destination an address prefix. The route which connects one autonomous system to one prefix may pass by other autonomous systems.

Each autonomous system may be assigned a unique identifier called "Autonomous System Number" (ASN).

For example, a path which passes in order by three autonomous systems named AS11, AS1 and AS56 may be represented as [AS11 AS1 AS56].

A path segment corresponds to a path portion which connects respectively two neighboring autonomous systems. For example, a path which passes in order by three autonomous systems AS11, AS1 and AS56 comprises two path segments [AS11 AS1] and [AS1 AS56].

BGP is a protocol which uses path update messages in order to announce path changes. Each update aggregates a list of autonomous systems required for reaching a given prefix and by which the path(s) pass.

Information about all the paths for reaching a prefix from a local autonomous system may be "accumulated" during a time interval by the local autonomous system and be aggregated in a matrix, allowing a representation of the paths announced to the local autonomous system.

The matrix comprises path segments which connect the autonomous systems over a pairwise path. In that way each matrix element corresponds to a path segment.

A time sequence of matrices can result from repetition according to step c), representative of a temporal evolution of the path segments which make up the announced paths.

The analysis of a similarity may correspond to a determination of a gap between one given matrix and one or several among the matrices of the sequence of matrices.

A path may show an anomaly when the corresponding prefix is illegitimate or invalid, or when the announced BGP attributes are illegitimate or invalid.

An anomaly may be a redirecting of routing paths by hijacking, i.e. by an illegitimate announcement of prefixes resulting in a rerouting of traffic and an impact on associated services.

Further, an anomaly may correspond to "man in the middle" type attack, i.e. intercepting traffic resulting from a local redirection of traffic without disrupting accessibility of the destination, i.e. of the address prefix.

Path redirecting may be voluntary or not, and even be caused by human or machine errors such as machine failures or abnormal behaviors.

The sequence of matrices may show an anomaly when there is a sudden change in the elements from one or more matrices during a time interval.

The detection of an anomaly may correspond to a classification as "normal" or "anomaly" in the set of paths or a portion of said set of paths.

The method may be implemented during a limited time or continuously.

Further, the sequence of matrices may comprise a fixed or variable number of matrices.

For example, during implementation of the method, the sequence of matrices is updated by repeatedly adding new matrices (step c). At the same time, the matrices from the sequence with the oldest date of addition may be deleted from the sequence.

The proposed method aims to address the previously mentioned disadvantages and to propose an implementation of a method for detection of an anomaly in a set of paths for the routing of data to an address prefix in a network composed of autonomous systems.

A spatial-temporal analysis of the received information can be done with the method by considering the presence or absence of a path segment in the set of paths (spatial analysis) and also the temporal changes of the path segments (temporal analysis).

Anomalies in the paths announced to the local autonomous system can be identified by the method by identifying one or more matrices which comprise one or more elements (representative of path segments) thought to be "abnormal."

The proposed method is innovative in the implementation of the spatial-temporal analysis of the received information.

The proposed method is, additionally, original in that it uses unlabeled data and in that the method is not supervised, allowing a better generalization of the analyses done.

In the implementation of the method, no prior knowledge about the properties of the system, for example about the autonomous systems involved or about the nature of the announced paths, is required. During the implementation, a computer device implementing the method may then learn by training (by implementing for example artificial intelligence) what types of matrices represent respectively a "normal" or an "anomaly" state. An example is given later of a normal matrix (FIG. 3a) compared to an anomaly matrix (FIG. 3b), where this latter has in the example shown nonzero coefficients below a zero diagonal, whereas FIG. 3a does not show this type of matrix property. Artificial intelligence may then learn that the type of matrix schematically shown in FIG. 3a does not a priori reveal an anomaly whereas a matrix which departs from this profile may in contrast reveal an anomaly. After the training phase, such artificial intelligence may detect an anomaly in a matrix which does not adhere to the standard profile.

The method considers a single prefix at a time and not all the prefixes of one autonomous system or a set of mixed prefixes, allowing a targeted analysis and a localized detection of an anomaly.

When an anomaly is detected, an alert may be issued.

The security in the networks can be improved and the rerouting of traffic in the network can be reduced by the proposed method.

The characteristics disclosed in the following paragraphs may, optionally, he implemented. They may be implemented independently of each other or in combination with each other.

In one embodiment, the step d) comprises:
- an estimate of an average trend on the matrices from the time sequence of matrices;
- a deviation estimate of one current matrix from the sequence relative to said average trend;

and, in step e):
    if the estimated deviation is beyond the threshold, detecting a routing anomaly revealed by said current matrix.

An average trend may correspond to properties or behaviors present in a majority or at least in a part of the matrices from the sequence of matrices, or to the calculation of the sum or a weighted sum of the elements of all the matrices or part of the matrices from the sequence.

Further, the estimate of the average trend may consider matrices which are not part of the present sequence, but for example a previously determined sequence.

A deviation estimate may be a quantitative or qualitative determination of difference between the elements or part of the elements of one current matrix and said average trend.

A threshold may be predetermined or be determined during implementation of the method.

A deviation value beyond the threshold may indicate a significant difference between the current matrix and the average trend representative of path segments thought to be "normal," and may be interpreted as a presence of an anomaly.

In an embodiment, the matrix determined in step b) has at least two dimensions and comprises elements, each specific to:
    a departing autonomous-system index of an announced path-segment, along a first dimension, and
    an arriving autonomous-system index of an announced path-segment, along a second dimension.

The expressions "departing autonomous system" and "arriving autonomous system" may be defined relative to the local autonomous system and relative to the autonomous system which is responsible for the address prefix.

The autonomous system responsible for the prefix may be a starting point of an announced path and the local autonomous system may be the destination. By starting from the autonomous system responsible for the prefix, the first autonomous system for respective path segments may be considered as "departing autonomous system," and the second autonomous system for respective path segments may be considered as an arriving autonomous system.

For example, a matrix may have the departing autonomous systems as elements on a first axis, and the arriving autonomous systems on the second axis, or vice versa.

The elements of the matrix may represent the path segments between a given departing autonomous system and a given arriving autonomous system.

For example, the matrix elements may have a value "1," indicating that a path segment is among the announced paths, or "0," indicating that a path segment is not among the announced paths.

In an embodiment, a new index is assigned to each autonomous system newly discovered in the announcements of said segments, where an initial index is incremented on each discovery of a new autonomous system taking part in said segments.

The autonomous systems may be numbered consecutively, according to the order in which they are "discovered," i.e. in the order in which they appear on the paths.

For example, an index of "0" may be assigned to the first autonomous system discovered (independent of the ASN thereof), an index of "1" to the second autonomous system discovered, etc.

This numbering may lead to recurring matrix structures in different autonomous system and prefix environments.

In an embodiment, the matrix has at least three dimensions, where each element of the matrix is further specific to a type of arriving autonomous system, along a third dimension.

Beyond the presence or absence of a pair of autonomous systems on a path, other characteristics in the matrices, such as the country of origin of the autonomous systems can be encoded in the third dimension.

For example, when an arriving autonomous system for a path segment is located in the United States, the corresponding element in the matrix may have the value "2." When an arriving autonomous system for a path segment is located in China, the corresponding element in the matrix may have the value "3," etc.

Further, one or more attributes which characterize a path segment, indicating for example the nature of the autonomous systems (e.g. client, supplier, peer) connected by a given path segment may be encoded with the third dimension in the matrices.

In an embodiment, each matrix of the sequence is represented in the form of an image with at least two dimensions, where each image comprises pixels and each pixel corresponds to an element of the matrix.

The representation of each matrix in image form allows a visualization of the content of the matrices, which may thus make the analysis and detection of an anomaly easier.

With repetition of step c), a succession of images can be created, i.e. a video visually representing the announced paths (spatial aspect) and the temporal development of the announced paths over time (temporal aspect).

In an embodiment, the coordinate of each pixel in the image is:
    a departing autonomous-system index of an announced path-segment, along a first image coordinate axis, and
    an arriving autonomous-system index of an announced path-segment, along a second image coordinate axis.

For example, an image may have the departing autonomous systems as elements on a first axis, and the arriving autonomous systems on a second axis, or vice versa.

The image pixels may therefore represent the path segments between a given departing autonomous system and a given arriving autonomous system.

In an embodiment, each pixel has a color depending on said type of arriving autonomous system of said pixel.

The color of said pixel may respectively indicate the presence or absence of a path segment in the set of announced paths.

For example, some pixels from the matrix elements may be white, indicating that a path segment is not among the announced paths, or black, indicating that the path segment is among the announced paths.

In an embodiment, the steps d) and e) are implemented by artificial intelligence.

The artificial intelligence may be configured for analyzing the similarity between the matrices and detecting an anomaly.

When steps d) and c) are implemented by artificial intelligence, no prior knowledge about the system is required. The artificial intelligence may train itself and learn to identify a "normal BGP dynamic" and some images corresponding to "normal" and "abnormal" paths respectively.

In an embodiment, the artificial intelligence is implemented by a spatial-temporal auto-encoder implementing unsupervised training configured for detecting an anomaly in the sequence of images.

An auto-encoder is an artificial neural network used for unsupervised training of discriminant characteristics.

An auto-encoder is specifically suited for detecting anomalies in matrix sequences.

An auto-encoder may take a matrix of elements as input, and "compress" the matrix in an intermediate step, i.e. reduce the number of elements of the matrix while keeping the information contained in the matrix as best as possible.

The auto-encoder may on output produce, from the compressed matrix, a matrix with the same dimensions as the input matrix, and determine a deviation between the input image and the output image.

The auto-encoder may be trained and learn to identify a matrix representative of a set of "normal" paths. When, the input matrix contains an anomaly, it is probable that this anomaly is not reproduced in the output matrix, which produces a gap between the output matrix and the input matrix.

The analysis of the deviation, and in particular the comparison of the deviation to a threshold, may serve to detect the presence or absence of an anomaly in the input matrix.

In an embodiment, the spatial-temporal auto-encoder implements prior training done on at least one other address prefix, called transfer learning.

When an auto-encoder has "learned" to recognize anomalies in matrices in a given autonomous-systems environment and for a given prefix, the acquired knowledge may be transposed in another auto-encoder for the application of the method in another autonomous-system environment and to another prefix.

In that way it is not necessary for each new auto-encoder to be trained. A new encoder may directly apply the knowledge previously acquired by an auto-encoder in a new autonomous system and prefix environment.

Assigning a new index to each autonomous system that is newly discovered in the announcements of path segments, and incrementing an initial index on each discovery of a new autonomous system taking part in said segments, such as previously described, is particularly advantageous in implementation of transfer learning.

In fact, the same general structures of elements appear in different autonomous system and prefix environments, when assigning a new index and incrementing an initial index such as described is respected.

The transfer learning may therefore be facilitated, and the adaptation time of an auto-encoder to a new autonomous system and prefix environment be reduced.

In an embodiment, no matrix dimension is greater than $\frac{1}{500}$ of the total number of existing autonomous systems.

The Internet is composed of tens of thousands of autonomous systems, approximately 65,000 autonomous systems.

However, it is not necessary that the first and second dimensions of each matrix comprise tens of thousands of elements representative of all the autonomous systems in the Internet.

For a given address prefix, the number of autonomous systems present on an announced path to a local autonomous system is limited, and is usually not greater than $\frac{1}{500}$ of the total number of existing autonomous systems, currently corresponding to 130 autonomous systems.

For a given prefix, the volume of data generated relative to the announced paths is therefore limited, so it is possible to get a clear and quick view of the announced paths.

In an embodiment, the information received according to step a) is included in BGP, for Border Gateway Protocol, type messages.

BGP type messages, i.e. BGP updates, provide information about announced paths, about changes in announced paths, etc., so the information required for generating the matrices according to step b) can be obtained.

In an embodiment, the information received according to step a) comprises at least one "AS Path" attribute representative respectively of autonomous systems located on an announced path.

The AS PATH attribute represents the sequence of autonomous systems through which the routing information passed.

For example, a path which passes in order by three autonomous systems named AS11, AS1 and AS56 may be represented by the AS PATH as AS PATH=[AS56 AS1 AS11].

The AS PATH attribute serves to encode the information required for the generation of the matrices according to step d).

Another aspect of the disclosure relates to a computer device for detecting an anomaly in a set of paths for routing data to an address prefix in a network composed of autonomous systems, where the paths are announced to a local autonomous system by autonomous systems neighboring the local autonomous system, the device comprising:

an interface for receiving information representative of at least one among the set of paths during a time interval;

a circuit for generating, from the received information, a matrix comprising elements representative of path segments for the set of paths, where the path segments respectively connect pairs of autonomous systems located on the set of paths;

a circuit for repeating receiving and generating in order to get a time sequence of matrices comprising elements representative of path segments from the set of paths;

a circuit for analyzing a similarity between the matrices of the sequence; and a circuit for detecting a routing anomaly in a case where at least one of the matrices from the sequence differs from other matrices from the sequence.

The computer device may comprise or be incorporated in a BGP router of the local autonomous system and collect information representative of at least one part of the set of paths.

The computer device may also be or comprise any other device to which the collected data are sent.

The computer device may be configured for implementing the aforementioned method.

The computer device aims to address the previously mentioned disadvantages and be configured for detection of an anomaly in a set of paths for the routing of data to an address prefix in a network composed of autonomous systems.

The computer device may do a spatial-temporal analysis of the information received, in the meaning where the presence or absence of a path segment among the set of paths ("spatial analysis") and also the temporal changes of the announced paths of the path segments ("temporal analysis") is considered.

The computer device is innovative in the implementation of a spatial-temporal analysis of the received information.

The computer device is, additionally, original in that it uses unlabeled data and in that the actions done are not supervised, allowing a better generalization of the analyses done.

The computer device does not require any prior knowledge about the properties of the system, for example about the autonomous systems involved or about the nature of the announced paths. The computer device may learn what types of matrices represent a "normal" or an "anomaly" state respectively.

The computer device considers a single prefix and not an autonomous system or several prefixes together, allowing a targeted analysis and a localized detection of an anomaly.

When an anomaly is detected, the computer device may issue an alert.

The computer device may improve security in the network and reduce rerouting of traffic in the Internet.

Further, measures may be taken concerning the paths which constitute an anomaly of a matrix with an anomaly. For example, in the case where some autonomous systems may be controlled by an administrator, the routing table of at least one of the local, controlled autonomous systems may be modified if a second system, not controlled and suspect, shares a path with anomaly with the controlled system. In fact, a BGP router of the local autonomous system comprising an input table where the paths received from the neighbors are inserted, a central table used for routing the packets, and an output table for the announcements made to the neighbors, if a path is thought abnormal by the device, the BGP router may not propagate the input table to the central table.

Another aspect of the disclosure relates to a computer program product comprising instructions which, when these instructions are executed by a processor, lead it to implement the steps of the aforementioned method.

This program may use any programming language (for example, an object-oriented language or other), and be in the form of an interpretable source code, a partially compiled code, or a fully compiled code.

FIG. 5 described in detail below may form the flowchart of the general algorithm of such a computer program.

BRIEF DESCRIPTION OF THE DRAWINGS

Other characteristics, details and advantages will appear upon reading the following detailed description, and analyzing the attached drawings, on which.

DETAILED DESCRIPTION OF CERTAIN EMBODIMENTS

The Internet is composed of autonomous systems, and sets of networks and routers under a single administrative authority. Various autonomous systems may be interconnected by paths for transporting traffic in data packet form, and BGP routers (Border Gateway Protocol) implementing a BGP protocol, with an objective of exchanging routing and accessibility information for which administrative authorities for the autonomous systems are responsible.

In order to allow the sending of traffic for one autonomous system to another, each autonomous system may announce to neighboring autonomous systems address prefixes for which it is responsible.

Figure 1:
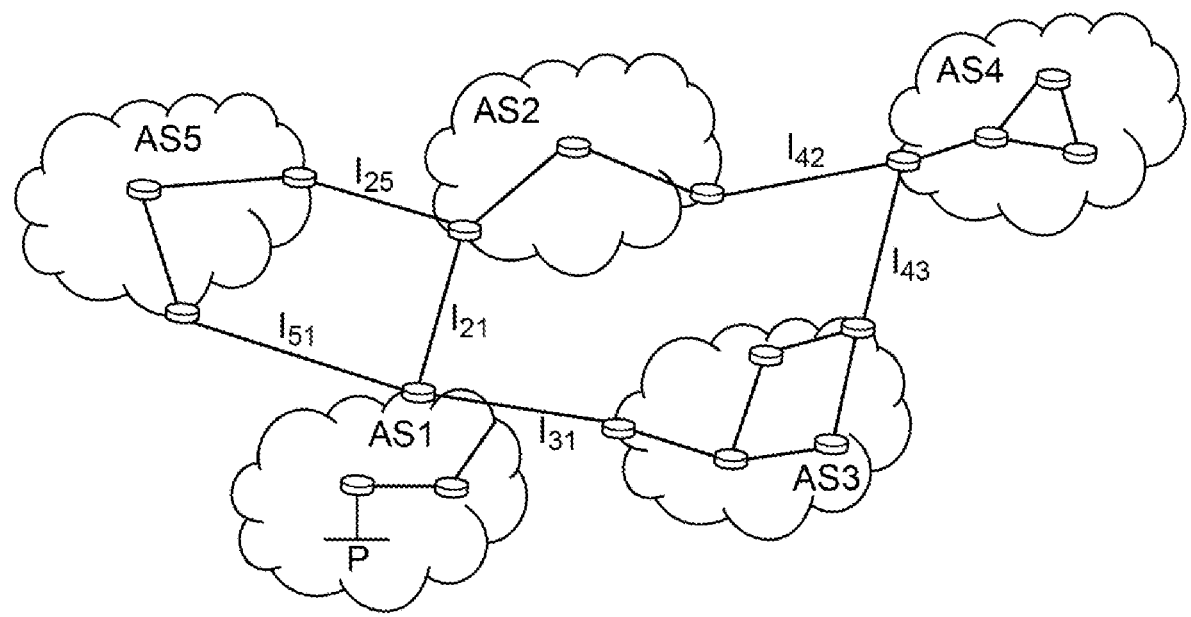
FIG. 1 shows a plurality of autonomous systems interconnected by paths which allow sending traffic to an address prefix.

FIG. 1 shows a plurality of autonomous systems AS1, AS2, AS3, AS4, AS5 respectively interconnected by path segments $I_{21}$, $I_{42}$, $I_{43}$, $I_{31}$, $I_{51}$, $I_{25}$.

The autonomous system AS1 is responsible for address prefix P and may announce this address prefix P on the Internet.

In this case, AS1 has three neighboring autonomous systems AS2, AS3, AS5, i.e. three autonomous systems to which it is connected without having to go through other autonomous systems.

The autonomous system AS1 may announce the prefix P to all or part of its neighbors AS2, AS3, AS5.

When the prefixes announced to AS2, AS3, AS5, these autonomous systems may do the same and announce the prefix P all or part of their neighbors, in this case to the systems AS2, AS5, AS4.

When AS2, AS3 and AS5 have several possible paths for reaching the prefix P, AS2, AS3 and AS5 may announce only their "best" path to their neighbors. For example, AS2 has a direct path to AS1 and an indirect path which passes through AS5. When the direct path from AS2 to AS1 is preferred, AS2 may announce only this direct path to AS4 and AS4 has no knowledge of the path which passes through AS5.

Thus, the autonomous system AS4 has two paths allowing it to reach the prefix P. A first path passes by AS2, and a second path passes by AS3.

Further, there may be several paths between the same two autonomous systems (not shown in FIG. 1).

The criteria which come into play for decision-making about the announced path are in part transmitted in the form of BGP attributes and update messages that the autonomous systems send, and in part configured in the BGP routers of each autonomous system.

The "best" path may be determined as a function of BGP attributes, such as LOCAL PREF or AS PATH.

The LOCAL PREF attribute is configured on a BGP router and informs the router of the interest in passing by one or another neighbor. For example, when AS4 and AS3 are suppliers and AS2 is a client, AS4 may have an interest in passing by AS2 instead of passing by AS3.

The attribute AS PATH represents the sequence of autonomous systems through which the routing information passed, i.e. the sequence of autonomous systems found on an announced path.

When a BGP router announces routing information to another autonomous system, it adds its own autonomous system number to the AS PATH sequence so as to avoid routing loops.

With equal LOCAL PREF, a router chooses the path for which AS PATH is the shortest; it then involves minimizing the distances between autonomous systems to cross in order to reach the destination.

Further, the "best" path may be determined as a function of the way in which an audit autonomous system announced the address prefixes. When a local autonomous system determines its "best" path going to a given address e.g. 11.0.0.5, if the routing table of the local autonomous system indicates two address prefixes e.g. 11.0.0.0/24 and 11.0.0.0/16, which make it possible to reach the address 11.0.0.5, the local autonomous system is generally programmed to choose the path which passes by the address prefix 11.0.0.0/24 because it is more specific than 11.0.0.0/16. A "pirate" local autonomous system programmed for an intrusion typically may then present a more specific address prefix in/24, for example, in order to reroute a part of the traffic.

Figure 2:
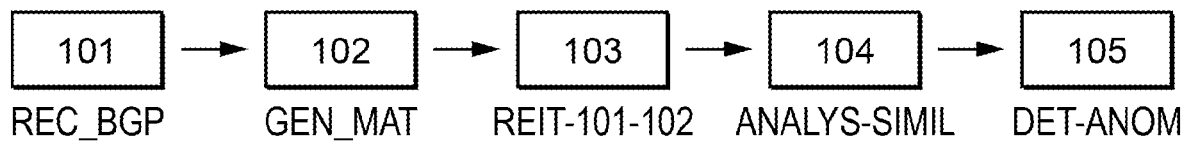
FIG. 2 shows a flowchart of a method for detection of an anomaly in a set of paths for the routing of data to an address prefix in a network composed of autonomous systems according to FIG. 1.

In order to detect whether the paths announced to the local autonomous system AS4 comprise an anomaly, AS4 may implement an anomaly detection method in the paths entering AS4 and the prefix P, such as shown in FIG. 2. The method may be implemented by a computer device 301 such as described by FIG. 5.

In a first step 101, AS1 may announce one or more paths to its neighbors AS2, AS3 and AS5 for reaching the prefix. Next, AS2, AS3 and AS5 may announce their path for reaching the prefix P to AS4.

AS4 receives representative information for the announced paths during a time interval. The time interval is typically of order several minutes, for example 5 minutes. However, shorter or longer time intervals are conceivable.

The method may comprise one or more preliminary processing steps related to filtering or augmenting data included in the received information.

The information received by the local autonomous system AS4 may comprise BGP attributes, in particular the AS PATH attribute.

The AS PATH attribute that AS4 receives from AS3 is therefore AS PATH=[AS3 AS1], because the "best" path for AS3, for reaching the prefix P corresponds to the direct path between AS3 and AS1.

The AS PATH attribute that AS4 receives from AS2 is AS PATH=[AS2 AS1], because the "best" path for AS2, for reaching the prefix P is the direct path which does not pass by AS5.

AS4 may therefore receive two AS PATH attributes corresponding to the announced paths of its neighbors: AS PATH=[AS3 AS1], corresponding to the path announced by AS3, and AS PATH=[AS1 AS2], corresponding to the path announced by AS2.

A new index may be assigned to each autonomous system newly discovered in the announcements of said segments, where an initial index is incremented on each discovery of a new autonomous system taking part in said segments.

If first the attribute AS PATH=[AS3 AS1] is received and then the attribute AS PATH=[AS1 AS2], the first autonomous system discovered is AS3, and the second autonomous system discovered is AS1, and the third autonomous system discovered is AS2. At this stage, AS4 may not know of the existence of AS5.

The autonomous systems may therefore be indexed as, for example:

AS4: 0 (because AS4 is at the origin of the paths); AS3=1; AS1=2; AS2=3; AS5=4.

In a second step 102, the paths received by AS4 in the time interval are aggregated in an image (or more generally a matrix), i.e. an image is generated from received information and comprises pixels (or more generally matrix elements) representative of path segments for the set of the paths. The path segments respectively connect pairs of neighboring autonomous systems which are found on the set of paths.

The image determined in the second step 102 may comprise several dimensions. A first dimension may comprise the indexes, i.e. identifiers of the departing autonomous systems of the path segments, in this case 0, 1, 2, 3, and a second dimension may comprise indexes for arriving autonomous systems of the path segments, in this case 0, 1, 2, 3.

The colors of the pixels from the image (or more generally the values of the elements of the matrix) serve to indicate whether the received information comprises a given path segment or not. For example, the image may be initialized with all white pixels (or more generally by setting all the values of the matrix elements to "0"). The colors of the pixels (or more generally the values of the matrix elements) representative of the path segments which are part of the announced paths may subsequently be set to another color, for example black (or, for the case of a matrix, to another value, for example "1").

In the case at hand, the following autonomous systems correspond to path segments which are part of the announced path: (AS1, AS2), (AS2, AS4), (AS1, AS3), (AS3, AS5).

Consequently, only the pixels with index pairs (2, 3), (3, 0), (2, 1), (1, 4) have a value equal to "1", according to the indexing introduced above.

In the third step 103, the first 101 and second 102 steps may be repeated in order to get a time sequence of images according to the second step 102, i.e. a video.

This repetition may be done continuously, or until getting a set number of images.

It can be assumed that during a short period the direct path between AS2 and AS1 is overrun, caused for example by an attack or an outage, and that the path now passes by AS5.

During this time interval, the path segment (AS1, AS2) disappears from path announcements and the new segments (AS5, AS2) and (AS1, AS5) appear.

The autonomous system AS5, newly discovered by AS4, has as index AS5: 4 (according to the previously described incrementation of the indexes).

In a fourth step 104, the computer device 301 may analyze a similarity between the images from the sequence and discover that one image from the sequence differs from most of the other images in that it comprises new segments (AS2, AS5) and (AS5, AS1), but not the segment (AS2, AS1).

The analysis of a similarity may comprise an estimate of an average trend over at least some images from the time sequence of images, and a deviation estimate for a current image from the sequence relative to said average trend.

In a fifth step 105, if the estimated deviation is beyond the threshold, a routing anomaly may be detected.

Following the detection of the anomaly, an alert may be issued.

The fourth step 104 and the fifth step 105 may be done by an artificial intelligence which may be part of the computer device 301.

In particular, the spatial-temporal auto-encoder is specifically suited for detecting an anomaly in a sequence of images. The principle of the auto-encoder is explained in the frame from FIG. 4.

Figure 3A:
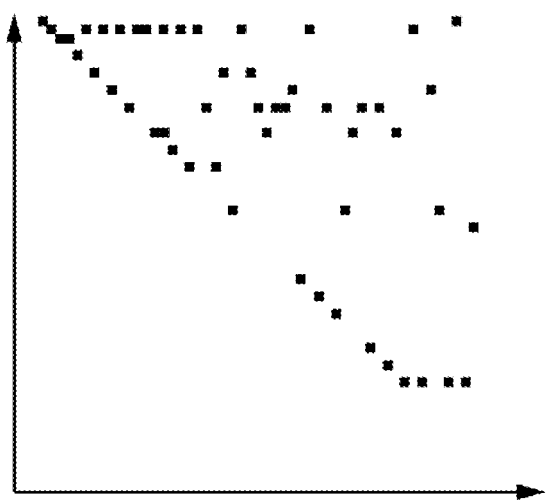
FIG. 3a and FIG. 3b represent two images generated by the method according to FIG. 2 and respectively representative of a normal state of announced paths to a prefix and of an anomaly.
Figure 3B:
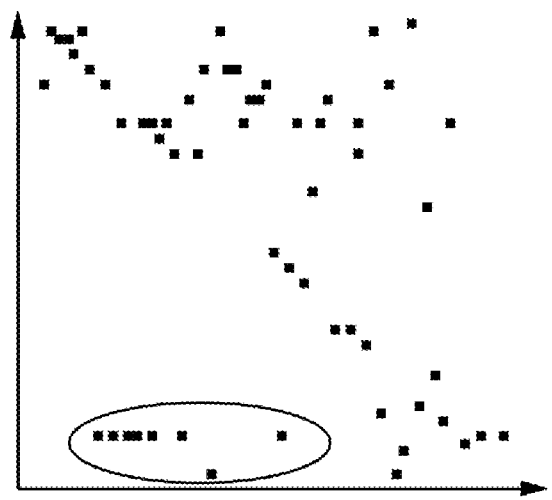

FIGS. 3*a* and 3*b* show two images generated by the method according to FIG. 2, representative of announced paths to a prefix and respectively classified as "normal" (FIG. 3*a*) and "anomaly" (FIG. 3*b*).

Each image represents paths received during a time interval. In order to generate each of the images, data about announced paths are accumulated and aggregated into one image. The image according to FIG. 3*a* corresponds to paths announced during a five-minute interval, and FIG. 3*b* represents paths announced during another five-minute interval.

The horizontal axis of each image represents departing autonomous systems for a path segment, and the vertical axis represents the arriving autonomous systems.

The axes may obviously be exchanged. However, it is crucial to keep the same convention for all images from an image sequence.

Each pixel from an image may have two values, represented as "black" and "white." A "black" pixel represents a path segment which is part of the set of paths. A "white" pixel represents a path segment which is not part of the set of paths.

Different images each representative of a normal state may show differences between them. However, images classified as "normal" have shared base characteristics. Pixels of each "normal" image constitute a recurring structure.

The image according to FIG. 3b comprises several pixels (encircled) far away from most of the other pixels, and which are not present in the image according to FIG. 3a. The auto-encoder may therefore detect an anomaly on the basis of these pixels far away from most of the other pixels.

In a variant (not shown in FIGS. 3a and 3b), the image may have at least three dimensions. For example, each pixel from the image may have a color specific to a type of arriving autonomous system, with the color attribute then representing the third dimension.

Beyond the presence or absence of a pair of autonomous systems on a path, each pixel may encode other characteristics such as country of origin of the autonomous systems.

For example, when the colors "black" and "white" are used to indicate the presence or absence of an autonomous system, shades of "gray" or other colors may be used in order to encode a country of origin of an autonomous system arriving on a path segment, or attributes which characterize this path segment, indicating for example the nature of the autonomous systems (e.g. client, supplier, peer) connected by a given path segment.

The Internet is composed of tens of thousands of autonomous systems, approximately 65,000 autonomous systems.

Typically, no dimension of an image is greater than $\frac{1}{500}$ of the total number of existing autonomous systems, currently corresponding to 130 autonomous systems, because the number of autonomous systems present on the paths announced to a local autonomous system for reaching a prefix is limited. However, a number over 130 may be used if necessary.

Figure 4:
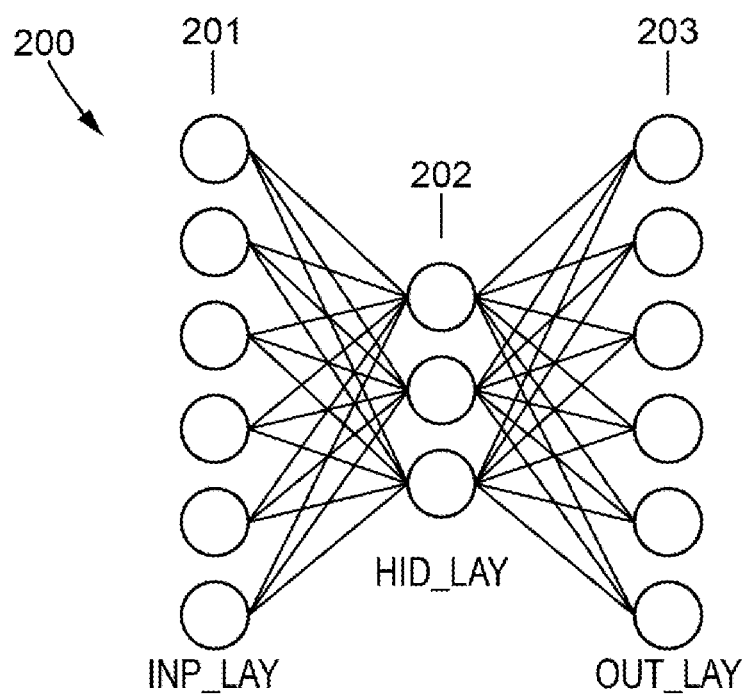
FIG. 4 shows an embodiment of an auto-encoder configured for detecting an anomaly in image sequences according to FIGS. 3a and 3b.

FIG. 4 shows an embodiment of a convolutional LSTM (Long Short-Term Memory) auto-encoder 200.

This type of auto-encoder 200 is specially adapted for recognizing structures in image sequences by simultaneously exploring spatial structures and temporal structures, i.e. spatial-temporal structures, and for thereby detecting anomalies in image sequences such as shown in FIG. 3b.

An auto-encoder 200 comprises an input layer 201, and output layer 203, and one or more hidden layer 202 arranged one after the other in series and located downstream from the input layer 201 and upstream from the output layer 203.

Each of these layers 201, 202, 203 comprises nodes. The nodes of the input layer 201 may be configured for receiving the image to be analyzed and for transmitting the received data to the hidden layers 202 located downstream from the input layer 201. Typically the input 201 and output 203 layers each comprise as many nodes as pixels included in the input image.

The auto-encoder 200 comprises a component called "encoder" configured for generating from the input image a compressed representation of the input image, and a component called "decoder," configured for reconstructing the input image from the compressed representation compensating as good as possible the loss of information caused by the compression of the image.

The number of nodes in each of the hidden layers 202 is less than the number of nodes in the input 201 and output 203 nodes, which is at the origin of the compression of the input image.

During a training period, the auto-encoder 200 may receive a plurality of input images without anomaly, and try to reconstruct an output image so as to minimize the deviation between the input image in the output image.

During the training, the encoder and decoder collaborate in order to find the most effective method for compressing the input image.

The auto-encoder 200 does not require labeling of input images. During implementation of the method, the auto-encoder treats the input images as they were received and immediately starts analyzing the image and recognizing spatial and temporal structures in the images.

The auto-encoder 200 thus learns to detect spatial and temporal structures in the image sequence and to find an effective compressed representation allowing it to reconstruct an output image while minimizing the deviation between the output image and the input image.

The input images which do not have an anomaly have shared structures and characteristics of a non-random nature which are recognized by the auto-encoder 200.

When the input image contains an anomaly, the auto-encoder 200 is not capable of reconstructing this anomaly in the output image.

The auto-encoder 200 then evaluates the reconstruction error of the input image by the output layer 203. The reconstruction error may correspond to a measurement of deviation between the output image and the input image, and may be interpreted as an "anomaly score".

A deviation below a threshold means that the auto-encoder 200 succeeded at correctly reconstructing the input image in the output layer. In this case, the auto-encoder 200 may conclude that the input image has no anomaly.

If the deviation is greater than a threshold, the auto-encoder 200 may conclude that the input image contains an anomaly, because the auto-encoder 200 has not succeeded at correctly reconstructing the image.

The threshold may be predetermined or be determined by the auto-encoder 200 during implementation of the method.

In this case, the auto-encoder 200 is configured (following a training period) for reproducing images such as shown in FIG. 3a. The pixels encircled in FIG. 3b constitute an anomaly and are not reproduced or are reproduced differently in the output image, and there is therefore a deviation between the input image and the output image. The deviation may exceed a threshold and the image according to FIG. 3b is then classified as "anomaly."

The auto-encoder 200 may comprise two main components, one for learning the spatial structures in the images, and the other for learning the temporal evolution of the spatial structures.

Advantageously, a spatial coder may be composed of two hidden convolutional layers 202, and a spatial decoder of two transposed convolutional hidden layers 202.

A temporal coder-decoder may be composed of three hidden convolutional LSTM layers 202, located between the spatial coder and the spatial decoder.

The information about the image compression is stored in the hidden layers 202.

Consequently, transfer learning may be implemented by transposing the hidden layers 202 of an auto-encoder 200 configured for recognizing anomalies in images into a new auto-encoder 200, which may then recognize the same type of anomaly in a new environment of autonomous systems and prefixes.

In fact, the same general structures may appear in the images, even when the autonomous system and prefix environment changes, in particular when the assignment of a new index and incrementing an initial index such as previously described is respected.

The training may be done continuously during implementation of the method. The auto-encoder 200 may thus adapt to changes in the environment thereof when the announced paths change.

For example, when agreements between different autonomous systems are modified, some paths are modified permanently, and the auto-encoder 200 may learn to recognize and classify this new environment as "normal."

Figure 5:
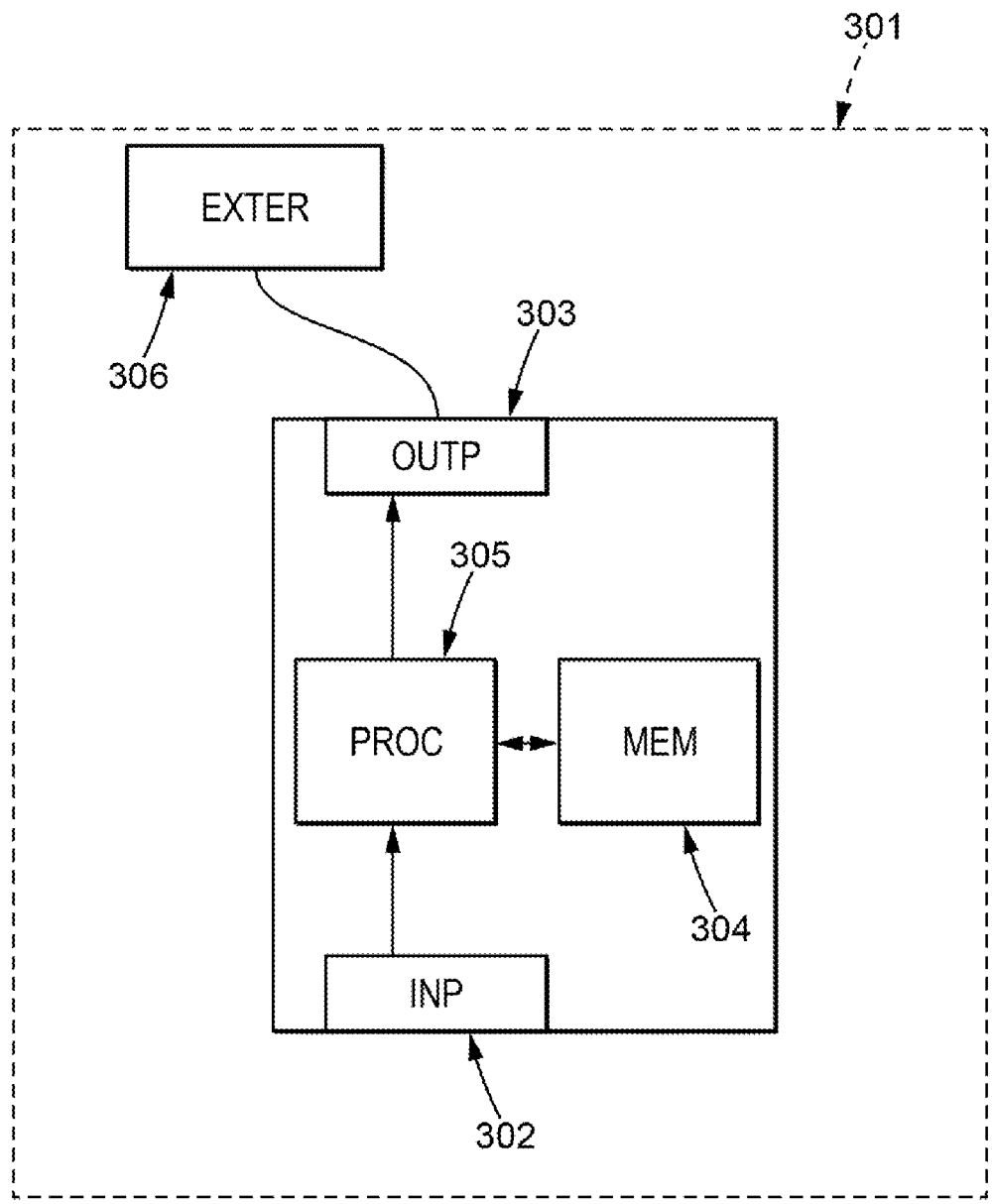
FIG. 5 shows a computer device adapted for detection of an anomaly in a set of paths for the routing of data to an address prefix in a network composed of autonomous systems.

FIG. 5 shows a computer device 301 for detecting an anomaly in a set of paths for the routing of data to an address prefix in a network composed of autonomous systems.

The computer device 301 may comprise or be incorporated in a BGP router of the local autonomous system which collects information representative of at least one part of the set of paths, or to any other device to which the collected data are sent.

The computer device 301 is suited for implementing the process described by FIG. 2.

In this embodiment, the computer device 301 comprises at least one input interface 302 for receiving messages or instructions, and at least one output interface 303 for communication with external devices 306 such as one or more neighboring autonomous systems or the BGP routers interconnecting the autonomous systems.

The at least one input interface 302 may be configured for receiving in step 101 information representative of at least a part of the set of paths during a time interval.

The computer device 301 further comprises a memory 304 for storing the instructions with which to implement at least part of the process, the received data, and the temporary data for implementing the various steps 101, 102, 103, 104, 105 and operations of the process such as previously described.

The computer device 301 further comprises processing circuits 305. Each circuit may be, for example:

- a processor able to interpret instructions in computer program form; or
- an electronic card, where the steps 101, 102, 103, 104, 105 and operations of the process from the disclosure may be described in the silicon; or even
- a programmable electronic chip like an FPGA chip (Field-Programmable Gate Array), like an SOC (System-on-a-Chip) or like an ASIC (Application-Specific Integrated Circuit).

The SOC, or system-on-a-chip, are embedded systems which incorporate all the components of an electronic system in a single chip. An ASIC is a specialized electronic circuit which brings together made-to-order functionalities for a given application. The ASICs are generally configured during their fabrication and cannot be simulated by an operator of the computer device 301. FPGA type programmable logic circuits are electronic circuits reconfigurable by the operator of the computer device 301.

Each processing circuit 305 may be configured for:
- generating 102, from received information, an image (or more generally a matrix below) comprising elements representative of path segments for the set of paths, where the path segments respectively connect pairs of autonomous systems located on the set of paths;
- repeating 103 receiving 101 and generating 102 in order to get a time sequence of images comprising elements representative of path segments from the set of paths;
- analyzing 104 a similarity between the images from the sequence; and
- in a case where at least one of the images from the sequence differs from other images from the sequence, detecting 105 a routing anomaly.

The computer device 301 may comprise an artificial intelligence configured for learning to analyze the similarity between images from the sequence, and should at least one of the images from the sequence differ from other images from the sequence, detecting a routing anomaly.

As a function of the embodiment, the computer device 301 may be a computer, a network of computers, an electronic component, or another device comprising a processor operationally coupled to a memory, and also, according to the embodiment chosen, a data storage unit and other associated material equipment like a network interface and a media reader for reading a removable storage medium and writing on such a medium not shown in FIG. 5. The removable storage medium may, for example, be a compact disk CD, a polyvalent digital video disk DVD, a flash disk, a USB key, etc.

As a function of the embodiment, the memory 304, the data storage unit or the removable storage medium contain instructions which, when they are executed by the processing circuit 305, lead this circuit to execute or control at least one input interface 302, at least one output interface 303, data storage in the memory 304 and/or data processing and/or implementation of at least one part of the method according to FIG. 2.

Each processing circuit 305 may be a component implementing the driving of the computer device 301.

Further, the computer device 301 may be implemented in software form, in which case it takes the form of a program executable by a processor, or in hardware form, as an application-specific integrated circuit ASIC, a system-on-a-chip SOC, or in the form of a combination of hardware and software elements, for example a software program intended to be loaded and executed on an electronic component described above such as an FPGA, processor.

The computer device 301 may also use hybrid architectures, for example architectures based on a CPU+FPGA, a GPU (Graphics Processing Unit) or an MPPA (Multi-Purpose Processor Array).

The present disclosure serves to detect an anomaly in a set of paths for the routing of data to an address prefix in a network composed of autonomous systems.

The present disclosure is not limited to the examples of devices, systems, methods, uses and computer program products described above, only as examples, but it encompasses all variants which could be conceived by the person skilled in the art in the context of the protection saw.

The invention claimed is:

1. A method for detection of an anomaly in a set of paths for routing data to an address prefix in a network composed of autonomous systems, where the paths are announced to a local autonomous system by autonomous systems neighboring the local autonomous system, the method comprising:
   a) receiving information representative of at least one part of the set of paths during a time interval;
   b) generating, from the received information, a matrix comprising elements representative of path segments for the set of paths, where the path segments respectively connect pairs of autonomous systems located on the set of paths;

c) repeating a) and b) to obtain a time sequence of matrices according to b);

d) analyzing a similarity between the matrices of the sequence; and e) in a case where at least one of the matrices from the sequence differs from other matrices from the sequence, detecting a routing anomaly.

2. The method according to claim 1, wherein d) comprises:

an estimate of an average trend on the matrices from the time sequence of matrices;

a deviation estimate of one current matrix from the sequence relative to the average trend;

and, in e):

if the estimated deviation is beyond the threshold, detecting a routing anomaly revealed by the current matrix.

3. The method according to claim 1, wherein the matrix determined in b) has at least two dimensions and comprises elements, each specific to:

a departing autonomous-system index of an announced path-segment, along a first dimension, and an arriving autonomous-system index of an announced path-segment, along a second dimension.

4. The method according to claim 3, wherein a new index is assigned to each autonomous system newly discovered in the announcements of the segments, where an initial index is incremented on each discovery of a new autonomous system taking part in the segments.

5. The method according to claim 3, wherein the matrix has at least three dimensions, where each element of the matrix is further specific to a type of arriving autonomous system, along a third dimension.

6. The method according to claim 1, wherein each matrix of the sequence is represented in the form of an image with at least two dimensions, where each image comprises pixels and each pixel corresponds to an element of the matrix.

7. The method according to claim 6, wherein the coordinate of each pixel in the image is:

a departing autonomous-system index of an announced path-segment, along a first image coordinate axis, and an arriving autonomous-system index of the announced path-segment, along a second image coordinate axis.

8. The method according to claim 6, wherein the matrix determined in b) has at least three dimensions and comprises elements, each specific to:

a departing autonomous-system index of an announced path-segment, along a first dimension, and an arriving autonomous-system index of an announced path-segment, along a second dimension, where each element of the matrix is further specific to a type of arriving autonomous system, along a third dimension, wherein each pixel has a color depending on the type of arriving autonomous system of the pixel.

9. The method according to claim 1, wherein d) and e) are implemented by artificial intelligence.

10. The method according to claim 9, wherein the artificial intelligence is implemented by a spatial-temporal auto-encoder implementing unsupervised training configured for detecting an anomaly in the sequence of images.

11. The method according to claim 10, wherein the spatial-temporal auto-encoder implements prior training done on at least one other address prefix, called transfer learning.

12. The method according to claim 1, wherein no matrix dimension is greater than 1/500 of the total number of existing autonomous systems.

13. The method according to claim 1, wherein the information received according to a) is included in Border Gateway Protocol ("BGP") type messages.

14. The method according to claim 1, wherein the information received according to a) comprises at least one Autonomous Systems Path ("AS Path") attribute representative respectively of autonomous systems located on an announced path.

15. A computer device for detecting an anomaly in a set of paths for routing data to an address prefix in a network composed of autonomous systems, where the paths are announced to a local autonomous system by autonomous systems neighboring the local autonomous system, the device comprising:

an interface for receiving information representative of at least one among the set of paths during a time interval;

a circuit for generating, from the received information, a matrix comprising elements representative of path segments for the set of paths, where the path segments respectively connect pairs of autonomous systems located on the set of paths;

a circuit for repeating receiving and generating in order to get a time sequence of matrices comprising elements representative of path segments from the set of paths;

a circuit for analyzing a similarity between the matrices of the sequence; and a circuit for detecting a routing anomaly in a case where at least one of the matrices from the sequence differs from other matrices from the sequence.

16. A processing circuit comprising a processor and a memory, the memory storing program code instructions of a computer program which, when the computer program is executed by the processor, implement the method according to claim 1.

* * * * *